Dec. 24, 1929.     R. KIENZL     1,740,604
CHASER
Filed May 9, 1927

INVENTOR:
RAYMUND KIENZL
By his atty.

Patented Dec. 24, 1929

1,740,604

UNITED STATES PATENT OFFICE

RAYMUND KIENZL, OF CLEVELAND, OHIO

CHASER

Application filed May 9, 1927. Serial No. 189,845.

My invention pertains to a chaser of novel design.

I have had several decades of experience with machine tools and screw-cutting machinery and tools therefor, hence realize that the art is highly developed and know, for instance, that gear teeth have been cut with what is known as a hunting-tooth action by means of a conjugate cutter having mutilated teeth of progressively or alternatively varying cutting adaptation, so that partial cuts are made at varying depths. As contradistinguished, my herein disclosed chaser has its teeth make complete or finished cuts, but not successively on corresponding sides of a thread, nor with more than one distinct cutting edge of any one tooth. Some teeth have just enough removed from one or two edges so that only the remaining edges are adapted to cut. For instance, the first tooth, (left end), cuts only at the bottom, the second tooth cuts only on its left side, the third tooth cuts only on its right side and the fourth tooth, (furthest to the right), cuts on all three sides as heretofore commonly practiced, but in the case of my chaser, the fourth tooth merely cleans out to assure a smooth job. A chaser so constructed makes a smoother and more precise cut because each tooth is cutting along only one edge and therefore does not create a crowding of the chips nor result in rough performance. It also avoids the likelihood of breaking points off of the chaser. My design of chaser also involves circumferentially arranged groups or axially extending rows of teeth, only one row of which is intended to be utilized during some specific cutting operation.

To properly employ a chaser of my design, so that the distinct rows of teeth may be alternatively caused to functionate, the chaser should be turnably mounted and a locking device should be provided for fixing one of the rows of teeth in correct position. It is additionally necessary accurately to present the cutting teeth in opposition to a rotating work piece, wherefore, I have designed a holder embodying an adjusting appliance including a chaser-engaging dog adapted, when the locking device is loosened, to accomplish a very delicate turning adjustment of the chaser.

It is to be realized that the scope of my invention comprehends many equivalent methods and constructions. The showing of the drawing and the particular description are merely specific exemplifications of a plurality of mechanical embodiments and arrangements.

Figure 4:
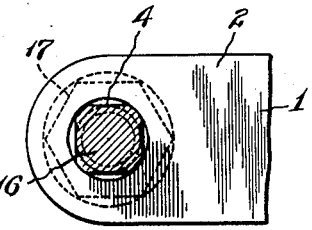
Figure 4 is a fragmentary section on line 4—4 of Figure 2.
Figure 2:
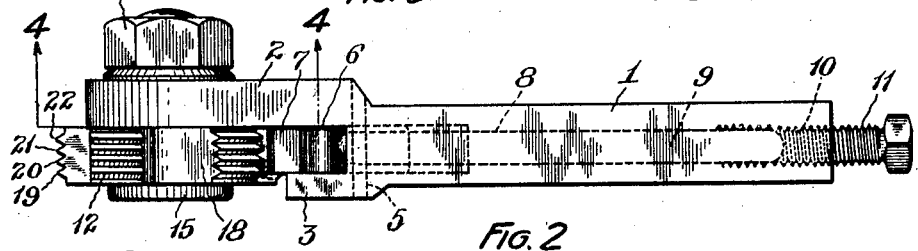
Figure 2 is a top plan view of Figure 1.

A holder 1 terminates at one end as a bifurcated construction including a projecting part 2 and a comparatively shorter projecting part 3. Near its free end the part 2 is fashioned with a square hole 4, which is illustrated in Figure 4. Pivoted on a pin 5, which extends between the parts 2 and 3, is a dog 6 terminating as a finger 7. The holder 1 is fashioned with a longitudinally extending bore 8, which is loosely occupied by a plunger 9, one end of which is adapted to engage the rear side of the dog 6. The free end of the holder 1 is fashioned with screw threads 10 with which a set screw 11 cooperates and which screw is adapted adjustably to push the plunger 9 against the dog 6.

Figure 3:
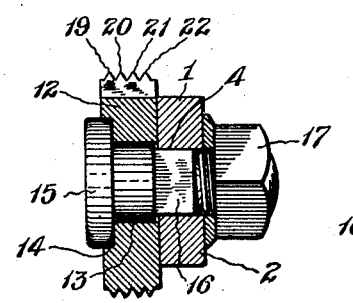
Figure 3 is a vertical section on line 3—3 of Figure 1.

A thread chaser 12 is fashioned with a central hole 13, which is counter-sunk at 14 for the partial accommodation of a head 15 of a bolt utilized to fix the chaser to the part 2. The shank of the bolt includes a square section 16 fitted to the square hole 4 and the parts are secured in position, as clearly revealed in Figure 3, by means of a nut 17.

Figure 1:
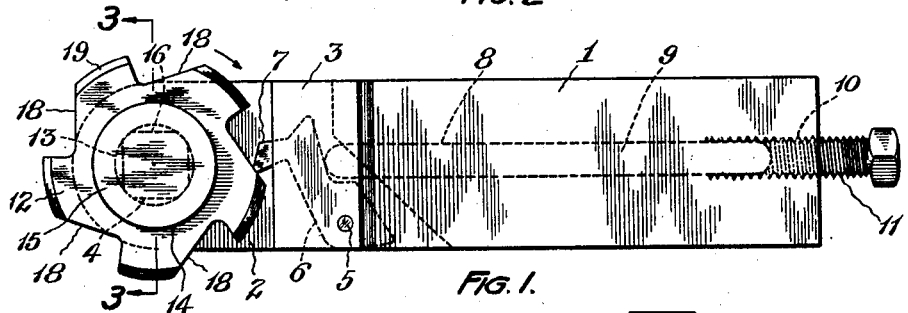
Figure 1 is a side elevation of a chaser and adjusting holder therefor both embodying principles of my invention.

As may be observed by inspection of Figure 1, the thread chaser 12 embodying my invention comprises a series of circumferentially arranged rows of cutting teeth between which the periphery of the cutter is recessed to include a corresponding circumferentially spaced series of surfaces 18. The assembly of my chaser and holder is so effected that the finger 7 of the dog will gravitationally engage one of the surfaces 18, as shown in Figure 1. Then, if the nut 17 be loosened, turning adjustment of the chaser 12 may be accomplished by advancing the set screw 11 to push the plunger 9 against the dog 6 and hence to cause the finger 7 to press against one of the surfaces 18. This arrangement permits the particular row of cutting teeth, which it is desired to have operate, to be accurately presented in opposition to a rotating work piece. If the screw 11 and plunger 9 be sufficiently retracted, the finger 7 may be rocked to a position beyond the path of movement of the tips of the teeth on the chaser so that the latter can be manually adjusted to bring a different one of the surfaces 18 opposite the finger 7 preparatory to having a different row of teeth perform the cutting operation. The five rows of cutting teeth may thus be successively used without the necessity of such frequent regrinding and loss of use of the chaser while so doing.

Figure 5:
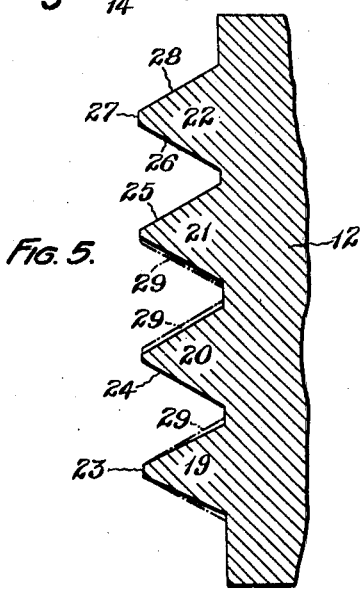
Figure 5 is an enlarged fragmentary view showing with full lines the cutting teeth of a thread chaser embodying my invention, the broken lines showing the amount that certain tooth defining surfaces are set back as compared with the conformation of the teeth of thread chasers in common use.
Figure 6:
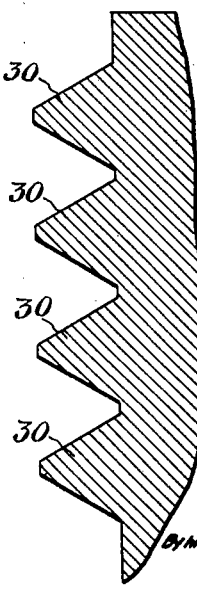
Figure 6 is a similarly enlarged fragmentary view of an old style cutter showing in full lines four teeth as a further aid to comparison with my new style of thread-chaser teeth.

Directing attention to Figure 5, it will be observed that four teeth 19, 20, 21 and 22 are there illustrated and that no two thereof are alike in shape, nor consequently in function. The tooth 19 has only a top cutting edge 23 designed to cut from the bottom of a thread groove. The tooth 20 effectively has only a left side cutting edge 24. The tooth 21 effectively has only a right side cutting edge 25. The tooth 22 has the usual three cutting edges 26, 27 and 28, but since the tooth 22 is the last to operate upon the blank, its function is principally to insure a clean finish. The broken lines 29 in Figure 5 indicate where the corresponding side edges of cutting teeth would be disposed if they were intended to cut or where they would be in order to define duplicate teeth 30 of the standard type of chaser (Fig. 6) heretofore used.

The number of circumferentially arranged groups of teeth may be varied, five being illustrated and preferred, because when one row is in operative position the surface 18 behind another row is about opposite the finger 7 and thereby facilitates the final delicate adjustment. The relative location of the four teeth 19, 20, 21 and 22 is preferably as shown, because the cutting of the bottom of the thread is the heaviest performance and therefore should be accomplished by the first tooth 19, which is thickest and therefore strongest at its end. It is to be observed that the dotted lines 29 on the first tooth 19 do not diminish the thickness of the end or the width of the cutting edge 23. The teeth 20 and 21 might feasibly be of less height than the tooth 19, but it is preferable to have them of the same height to insure an accurate bottom cutting. Practical use has demonstrated that a thread chaser embodying my invention may be operated more quickly and yet achieve a cleaner job.

I claim:

1. A chaser having a series of teeth of equal height and disposed in the same axial plane, one of said teeth being fashioned only with a top cutting edge, another only with a single lateral cutting edge and a third only with a single lateral cutting edge on an opposite side with reference to the location of the lateral cutting edge on the other second mentioned tooth.

2. A chaser provided with a plurality of teeth correspondingly arranged with reference to a certain axial plane and in a row, the first one of said teeth having only one cutting edge, the second one of said teeth having only one lateral cutting edge and the third one of said teeth having only one lateral cutting edge oppositely located than the first mentioned lateral cutting edge all of said teeth being of such size as to cut a finished edge of a screw thread.

3. A chaser provided with a plurality of axially alined teeth of equal height, one of said teeth having only an end cutting edge, another one of said teeth having a cutting edge on only one side and another one of said teeth having a cutting edge on only the relatively opposite side.

Signed by me, this 6th day of April, 1927.

RAYMUND KIENZL.